United States Patent Office 3,045,277
Patented July 24, 1962

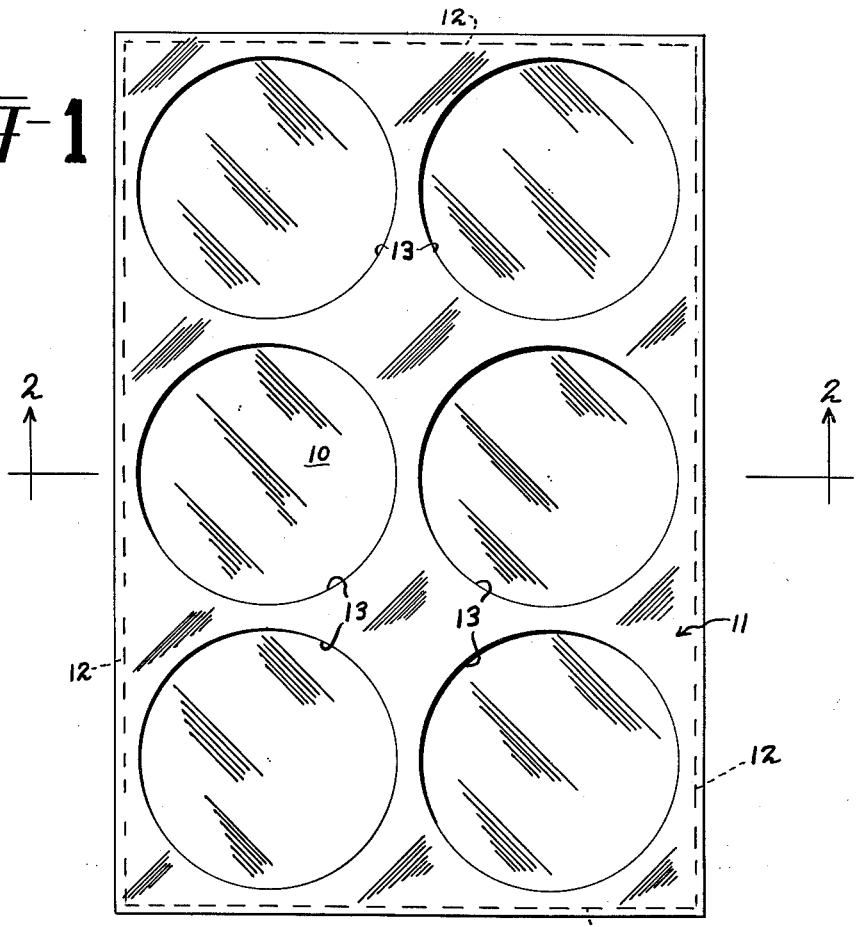
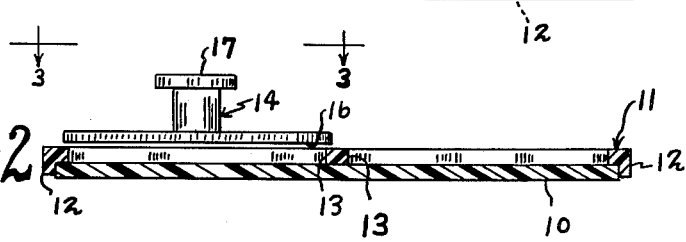
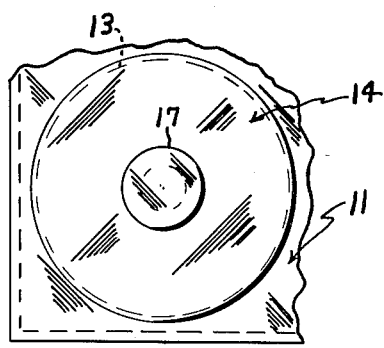

3,045,277
GROUND MEAT MOLD
James D. Carpenter, P.O. Box 126, Anniston, Ala.
Filed Nov. 20, 1959, Ser. No. 854,303
1 Claim. (Cl. 17—32)

This invention relates to a ground meat mold and more particularly to a mold for forming hamburgers and the like.

An object of my invention is to provide a ground meat mold which shall be adapted to form a plurality of hamburgers or the like at a time, thereby saving time.

Another object of my invention is to provide a ground meat mold of the character designated which shall be adapted to form all of the hamburgers or the like of a uniform size and shape.

A further object of my invention is to provide a ground meat mold of the character designated which shall be easily cleaned after the hamburgers or the like are formed, thereby maintaining the mold in a sanitary condition at all times.

A further object of my invention is to provide a ground meat mold of the character designated which shall be simple of construction, economical of manufacture and one which is attractive in appearance.

A still further object of my invention is to provide a ground meat mold of the character designated in which the supporting surface on which the hamburgers or the like are formed may also serve as a grill or support for the hamburgers while they are being cooked.

Heretofore in the art to which my invention relates, various forms of devices have been devised for molding ground meat and the like. However, so far as I am aware, such devices have been complicated in construction and very difficult to maintain in a clean and sanitary condition. To overcome these and other difficulties, I provide a ground meat mold which comprises a minimum of parts and one which is easily maintained in a clean condition due to the fact that all of the parts thereof are easily accessible for cleaning.

A ground meat mold embodying features of my invention is illustrated in the accompanying drawing, forming a part of this application, in which:

FIG. 1 is a top plan view of the mold;

FIG. 2 is a sectional view taken generally along the line 2—2 of FIG. 1 and showing a suitable tool for pressing the ground meat into the receptacles therefor; and FIG. 3 is a fragmental top plan view taken generally along the line 3—3 of FIG. 2.

Referring now to the drawing for a better understanding of my invention, I show a relatively flat plate-like member 10. Positioned on and disposed to lie flat against the upper surface of the plate-like member 10 is a relatively flat member 11 having depending flanges 12 which are adapted to telescope over the edges of the plate-like member 10, as shown in FIG. 2, whereby lateral movement of the members 10 and 11 relative to each other is limited.

A plurality of vertical openings 13 are provided through the uppermost member 11, as shown in FIGS. 1 and 2. The openings 13 are of a size to define with the subjacent surface of the lowermost plate-like member 10, which is within the confines of the opening 13, a receptacle for receiving a predetermined amount of ground meat.

The ground meat or the like may be pressed into the receptacles defined by the openings 13 and the subjacent surface of the plate-like member 10 by a suitable tool, such as the tool indicated at 14. The tool 14 is provided with a relatively flat undersurface 16, which is slightly greater in width than the diameter of the opening 13, for engaging and pressing the ground meat into the openings 13. The tool 14 may be provided with an upstanding operating handle 17, as shown.

The thickness of the plate-like member 10 is slightly greater than the depth of the flanges 12, as shown in FIG. 2, whereby the uppermost plate-like member 11 remains in constant contact with the subjacent plate-like member 10, thereby preventing the ground meat from passing between the adjacent plate-like members.

From the foregoing description, the operation of my improved ground meat mold will be readily understood. The plate-like member 10 is positioned on a suitable supporting surface and the uppermost member 11 is positioned on top of the plate-like member 10, as shown in FIG. 2, whereby the depending flanges 12 telescope over the edges of the lowermost plate-like member 10. With the members 10 and 11 in firm engagement with each other, the ground meat is positioned in each of the openings 13 and is then pressed downwardly into the openings by a suitable tool, such as the tool 14. In view of the fact that the undersurface 16 of the tool 14 slides over the relatively flat upper surface of the member 11, a predetermined amount of ground meat is positioned in each of the openings 13. That is, the opening 13 is completely filled with ground meat and excess meat is forced outwardly of the opening by the tool 14, whereby the amount of ground meat in each of the receptacles defined by the openings 13 and the subjacent surface of the plate-like member 10 corresponds to the size of the receptacle.

After the ground meat is formed in the openings 13, the uppermost member 11 is lifted off the plate-like member 10, thereby leaving the formed amounts of ground meat on the plate-like member 10. That is, the uppermost member is adapted for free vertical movement in a plane perpendicular to the plate-like members 10 and 11. The ground meat may be transferred from the plate-like member 10 to a suitable grill or other cooking surface. However, the plate-like member 10 may be formed of a suitable material whereby the ground meat may be actually cooked on the plate-like member 10 instead of being transferred to another cooking surface. That is, where the ground meat is to be transferred to another cooking surface, the plate-like member 10, as well as the uppermost member 11, may be formed of a suitable plastic material or the like. However, where the lowermost plate-like member 10 is to be used as a grill to cook the ground meat, the plate-like member 10 is formed of a suitable heat resistant material, such as metal or the like.

The excess meat positioned within an opening 13 and removed by the tool 14 may be transferred to another opening 13 or may be transferred back to the original quantity of ground meat, thereby eliminating waste of the ground meat and at the same time providing uniform amounts of ground meat in each of the openings 13.

From the foregoing, it will be seen that I have devised an improved ground meat mold which is attractive in appearance and extremely simple of construction and manufacture. Also, by providing relatively flat surfaces, with the exception of the openings for receiving the ground meat, the device may be easily cleaned in a minimum of time.

While I have shown my invention in but one form, it will be obvious to those skilled in the art that it is not so limited but is susceptible of various changes and modifications without departing from the spirit thereof, and I desire, therefore, that only such limitations shall be placed thereupon as are specifically set forth in the appended claim.

What I claim is:

A ground meat mold comprising a relatively flat plate-like member having a flat upper surface, a second relatively flat member having flat, smooth upper and lower surfaces and disposed flat against the adjacent flat surface of said first plate-like member, said second relatively flat member having depending peripheral flanges formed integrally with the edges thereof and disposed in telescoping engagement with the edges of said first plate-like member whereby the edges of said first plate-like member are wholly concealed, there being a plurality of spaced apart openings in said second relatively flat member inwardly of the edges thereof of a size to define with the subjacent surface of said first plate-like member within the confines of said openings receptacles for receiving predetermined amounts of ground meat, and a pressing member having a relatively flat contact surface of a width greater than the width of each receptacle for pressing the ground meat into said receptacles.

References Cited in the file of this patent

UNITED STATES PATENTS

| | | |
|---|---|---|
| 2,173,760 | Moran | Sept. 19, 1939 |
| 2,291,672 | Youngberg | Aug. 4, 1942 |